Figure 1:
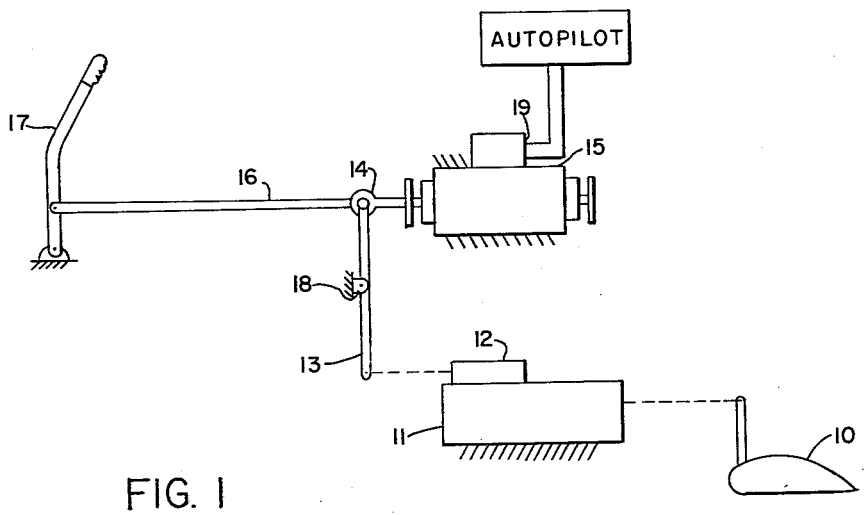

Oct. 30, 1962     W. F. ACKER ET AL     3,060,895

COMBINED MANUAL AND AUTOMATIC CONTROL APPARATUS

Filed Nov. 2, 1959

INVENTORS
ADOLPH M. HANSON
WILLIAM F. ACKER

BY

ATTORNEY

United States Patent Office 3,060,895
Patented Oct. 30, 1962

3,060,895
COMBINED MANUAL AND AUTOMATIC
CONTROL APPARATUS
William F. Acker, St. Petersburg, Fla., and Adolph M. Hanson, St. Paul, Minn., assignors to Minneapolis-Honeywell Regulator Company, Minneapolis, Minn., a corporation of Delaware
Filed Nov. 2, 1959, Ser. No. 850,382
12 Claims. (Cl. 121—38)

The present invention relates to an improvement in aircraft control systems of the sort having both manual and automatic modes wherein the manual means may override the automatic control apparatus.

The prior art hydraulic servo motors, to permit overpowering, have been provided with spring-loaded, pressure-sensitive bypass valves arranged in parallel across the servo piston. These valves prevent the development of excessive differences in hydraulic pressure between the two sides of the servo piston, by permitting the flow of fluid past the spring-loaded valves from one side of the servo piston to the other, to thereby relieve the excessive pressure. When the servo is used in an aircraft, the excessive hydraulic pressure differential may be developed by the pilot as he moves his control stick to overpower the servo (overpower force); or the excessive pressure differential may result from an effort by the servo motor to drive the servo piston with excessive force (stall force).

Although it is desirable to maintain, at a terminal where the forces are utilized, the manual overpower force equal to the manual stall force, this is rarely possible with a pressure sensitive by-pass valve of the type just described. There is ordinarily a relatively large increment of friction between the servomotor piston shaft and the hydraulic seals that surround each end thereof, and additional friction between the piston and the walls of the servo cylinder. Thus, in order for the pilot to overpower the servo, he must exert a force at such terminal equal to the hydraulic force required to operate the by-pass valve spring plus the total frictional force. On the other hand, when the output shaft is being moved by internal pressure the total force on the servo output shaft transmitted to the terminal (stall force), is less than the hydraulic force at which the by-pass valve operates, because the total output force of the piston applied to the terminal is equal to the hydraulic force on the piston minus frictional forces. When the frictional forces are comparatively large, there may be a fairly large difference of the terminal between the over power force and the stall force. This difference, which is referred to as hydraulic hysteresis, is generally undesirable in hydraulic servo motor operation.

The present invention pertains to a hydraulic servo motor wherein overpower and stall forces applied to a terminal external to the servomotor are maintained substantially equal, thereby eliminating the above described hydraulic hysteresis problem. We accomplish this by providing a by-pass arrangement that is sensitive to force applied manually or by the servomotor on the servo output shaft, rather than being sensitive to pressure across the servo piston. This force-sensitive arrangement has the further advantage of permitting rather precise adjustment of the overpower and stall forces, with a minimum of hysteresis at any force setting.

Thus, it is a principal object of this invention to provide an improved by-pass arrangement in a hydraulic servo, whereby the manual overpower and stall forces of the servo can be readily controlled and wherein there is a minimum of hydraulic hysteresis.

Figure 2:
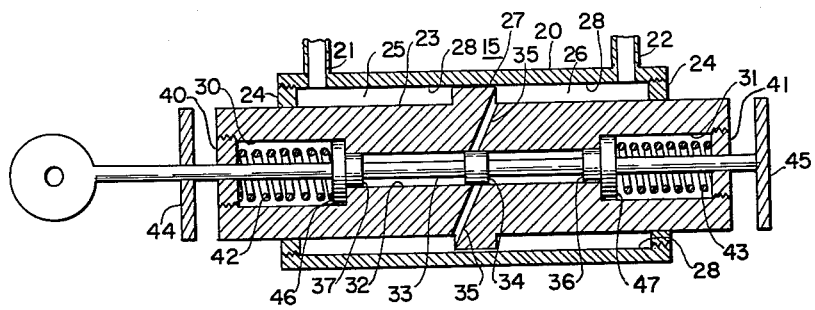

These and other objects and features of our invention will become readily apparent from an examination of the following description, taken in conjunction with the accompanying drawings in which:

FIGURE 1 schematically shows a combined manual and automatic control system for an aircraft surface; and
FIGURE 2 is a sectional elevational view of the hydraulic parallel servo shown in FIGURE 1.

In FIGURE 1, aircraft control surface 10 is operated by hydraulic cylinder 11, normally called a boost cylinder or power cylinder, which is controlled by valve means 12, the necessary hydraulic connections not being shown. Valve 12 of cylinder 11 is controlled by lever 13 pivoted at 18 and also pivotally connected at a terminal 14 to a parallel hydraulic servo 15, so called because its operation moves links 16 and stick 17, and a link 16 connected to a manual control stick 17. The parallel hydraulic servo 15 includes and is controlled by an electro-hydraulic transfer valve 19 which in turn is controlled by an electrical control system such as an autopilot or the like. Preferably, valve 19 is of the sort disclosed in the Frank W. Ainsworth Patent 2,860,606, issued November 18, 1958 and entitled "Valve Control."

Servo 15 embodies the essential elements of the present invention, which dispenses with the previously mentioned by-pass valves, and is therefore shown in greater detail in FIGURE 2. As will be noted in FIGURE 2, servo 15 comprises a cylinder 20 having hydraulic connections 21 and 22 at the opposite ends thereof. A piston member 23 is operable within cylinder 20 and is slidably sealed therein by end plugs 24. Some type of hydraulic seal (not shown) is preferably provided between elements 24 and piston 23. Piston member 23 includes an annular piston portion 27 engaging the inner bore 28 of cylinder 20 and dividing the space within the cylinder into separate compartments 25 and 26, compartment 25 being in communication with hydraulic connection 21 and compartment 26 connecting to hydraulic duct 22.

Piston member 23 has a relatively small diameter bore 32 centrally located therein and symmetrical with respect to piston portion 27. This relatively small bore opens into larger bores 30 and 31 disposed at the extremities of the member 23, these larger bores 30 and 31 being closed by end plugs 40 and 41, respectively. A fluid passage 35 is connected from one side of piston portion 27 to the other side in a manner transversing bore 32, this passage, when open, permitting the bypassing of liquid from one side of piston portion 27 to the other side and thereby permitting manual override. Normally, passage 35 is closed by a valve member, or land, 34 carried by a rod or stem 33, which is slidably carried by plugs 40, 41 and extends out both ends of member 23 and serves as the output member of the servo. Guide members 36 and 37 are attached to stem 33 and arranged to align, when member 34 is in a position to seal off passage 35, with the terminus of bores 31 and 30 respectively. These guide members 36 and 37 thus not only provide a guiding function but also serve as portions of the centering means used herein. It should be noted that valve member 34, and guide members 36 and 37, are sized to provide a hydraulic fit with bore 32, so that hydraulic seals are unnecessary, and relatively little friction is involved in moving stem 33 within piston member 23. A washer or abutment member 47 is arranged at the innermost end of passage 31 and normally engages both the end of bore 31 and member 36 and is held in this normal position by a spring 43 engaging end plug 41. Similarly, at the other end of member 23, a member 46 engages the bottom of bore 30 and also engages guide means 37. Member 46 is held in the position described by spring 42 also engaging end plug 40. To limit the overall travel of stem 33, limit means 44 and 45 are provided. It should be noted that the total travel of stem 33 is only a small percentage of the total travel of member 23.

*Detailed Operation*

With the automatic servo energized and operative, and hydraulic fluid supplied under pressure to valve 19 and thus to servo 15, and hydraulic fluid also being available to valve 12 and servo 11, any signal calling for a change in position of surface 10 will cause operation of valve 19 in a manner such as described in the aforementioned patent and this operation will cause a difference in pressure in chambers 25 and 26 of servo 15 through passages 21 and 22. The pressure difference thus caused will tend to move piston portion 27, and thus piston member 23 in one direction or another. This movement drives lever 13 and valve 12, which in turn causes cylinder 11 to operate surface 10 in the manner desired.

Note that when there is a pressure difference existing between chambers 25 and 26, the pressures transmitted to member 34 are transverse to its direction of motion so that, except for the limited leakage inevitable in high pressure hydraulic equipment, there is no bypassing of liquid. However, if for any reason, the pilot desires to control the craft manually and exerts force on stick 17, the force transmitted through link 16 and pivot terminal 14 is exerted on stem 33. When this force exceeds the force exerted by one or the other of springs 42 and 43, which is referred to above as an overpower force, then stem 33 and valve member 34 shift from the centered position, thereby permitting the flow of fluid through passage 35. This flow of fluid tends to neutralize the pressure difference between chambers 25 and 26 and permits piston member 23 to be readily moved and, because this member can then be moved by the overiding force exerted through link 16 and terminal 14, lever 13 can thus be operated manually to thereby operate valve 12 and cylinder 11 to control the surface 10.

Upon the manual effort being removed from stick 17, automatic control is resumed and the system works in the normal manner.

It is important to note that the overpower force at terminal 14 necessary to move valve member 34 and open passage 35 is determined almost entirely by the force necessary to compress one of the two springs 42 or 43. Although there is a very slight friction in the movement of elements 34, 36 and 37 within bore 32, this is nominal and has very little bearing on the overpower force requirement. This results from the fact that elements 34, 36 and 37 are sized to provide a hydraulic fit with bore 32, no seals being used. Thus, the pressure across piston portion 27 has only incidental bearing on the required overpower force. It is therefore obvious that the manual overpower force can be readily adjusted by selection of springs 42 and 43, without consideration of the frictional forces involved in the movement of piston member 23, and the actual overpower force at terminal 14 required is approximately equal to the spring setting.

On the other hand, the valve 34 and its associated elements is also capable of exerting an output, or stall force at terminal 14 equal to said spring setting, and independent of said frictional forces. When sufficient pressure differential exists across piston portion 27, to cause a force at point or terminal 14 equal to the spring setting, irrespective of the frictional forces, there will be relative movement between valve member 34 and bore 32, and a resultant release of the differential pressure. Thus, the force sensitive by-pass configuration that we have shown substantially equalizes the stall and over power forces, thereby eliminating the above described hysteresis condition, and permitting easy adjustment of over power forces. Notice that springs 42 and 43 can be adjusted separately so that the over power force to the left can be different from that to the right if desired. Although a slide valve and spring centering means are shown, it should be understood that alternate configurations could be used such as, for example, puppet, flapper, reed, rotary, ball or needle valves, or, for example, detent, magnetic, hydraulic or electromagnetic centering arrangements.

Thus, although the present invention has been disclosed in a preferred form, it is obviously susceptible of many modifications and equivalents, and its scope should therefore be determined only by the appended claims.

We claim:

1. A hydraulic actuator comprising: a cylinder having sealing means at its ends; a center-bored piston member slidably mounted therein and cooperating with said cylinder and said sealing means to form two fluid chambers, said piston member being formed with a pair of fluid passages individually connecting said chambers and said center bore; an output member having a valve member formed thereon, longitudinally located in said bore with said valve member normally positioned to close said passages; and means located at the ends of said piston to prevent relative motion between said piston and output member during normal operation of said actuator.

2. Control apparatus for controlling a condition by operating a condition control member, comprising: a fluid actuator including a center-bored piston slidably mounted in a closed cylinder to define a pair of annular fluid chambers therewith and formed with a pair of fluid passages individually connecting said chambers and said center bore, a longitudinally mounted output member having a land thereon normally positioned to close said pair of passages, and means for preventing relative motion between said output member and piston during normal operation of said actuator; manual control means operatively connected to said output member; control means including said condition control member operatively connected to said output member; and means for automatically and differentially directing fluid to said chambers to move said piston and output member thereby moving said manual control means and said condition control member.

3. A hydraulic actuator comprising: a cylinder, a piston, said piston and said cylinder defining two chambers, means supplying different pressures to said chambers, by-pass valve means mounted in said piston and operable from a closed or centered position to limit the force exerted by the piston due to the different pressures by reducing the differential pressure between said chambers, and means for uncentering said valve means and operated in response to a force exerted on said valve means to limit the force exerted by said piston.

4. A hydraulic actuator comprising: a cylinder; a piston slidably mounted in said cylinder so as to define two annular chambers therewith; an output member; and biased valve means including a portion of said output member mounted in said piston and biased to a closed position but displaceable therefrom so as to establish a fluid connection between said chambers in response to predetermined opposing forces applied to said output member and piston.

5. A hydraulic actuator comprising: a cylinder; a piston slidably mounted in said cylinder so as to define two closed annular chambers therebetween, and formed with a longitudinal bore through the axis thereof, a chamber at each end of said bore, and a pair of passages individually connecting said annular chambers and said bore; an output member having a plurality of lands thereon slidably mounted in said bore; and biasing means mounted in said end chambers to normally center one of said lands in a position to close said passages, an axial force on said output member and said piston equal to the force exerted by said biasing means, being effective to cause relative movement between said one land and said passages to thereby connect said passages and limit said force.

6. A hydraulic actuator as claimed in claim 5, additionally comprising: limiting means mounted to said output member, said limiting means being effective to limit said relative movement.

7. A hydraulic actuator, comprising: a cylinder having a pair of fluid lines connected thereto; a piston slidably mounted in said cylinder so as to define two fluid-filled annular chambers therebetween, and formed with an internal cylindrical cavity at each end thereof, an axial bore connecting said cavities and having a smaller diameter than said cavities, and a pair of passages individually connecting said chambers to said bore; a spool having a plurality of lands thereon slidably mounted in said bore and having a length equal to the length of said bore, two of said lands being located at opposite ends thereof and a third land intermediate thereto; biasing means mounted in each of said cavities and arranged to oppositely bear on said two lands so as to normally center said spool in said bore and position said third land to close said passages; and output means integrally connected to said spool along the axis thereof, said output means and piston being axially moved in unison until the axial force on said output means exceeds the opposing force exerted by one of said adjustable biasing means whereupon said spool is moved relative to said piston to thereby connect said passages and limit said axial force.

8. A hydraulic actuator as claimed in claim 7, additionally comprising limiting means mounted at each end of said spool as an integral part thereof, said limiting means being effective to limit the relative motion between said spool and said piston.

9. A hydraulic actuator comprising: output means; means intermediate a plurality of fluid filled hydraulic chambers connected to said output means, a difference in pressure between said chambers being effective to produce force on said output means; and valve means connected between said chambers, said valve means being effective to sense said force on said output means and operate responsive thereto in such a manner as to by-pass a portion of said fluid between said chambers so as to limit said force.

10. In a hydraulic actuator comprising a cylinder, a piston slidably mounted in said cylinder so as to define two annular passages or chambers therewith, and a control valve for applying fluid pressure to either chamber, in combination: an output member; bypass valve means for establishing a fluid connection between said two chambers; and means operating said by-pass valve means in response to a pressure in one of said chambers resulting in a force on said piston exceeding a predetermined force derived from said by-pass valve means.

11. The apparatus of claim 3, wherein said by-pass valve means consists of a member movable in either direction from a normal centered position to open a by-pass connection between said two chambers.

12. In a hydraulic actuator having a cylinder, a piston, said piston and cylinder defining two chambers, and means for applying pressures to one or the other of said chambers, in combination: by-pass valve means connected between said two chambers and displaceable from a normal position to reduce the differential pressure between said chambers, means centering said valve in normal position, and means connecting the piston and bypass valve means to apply the force on the piston in opposing relation to the force provided by the centering means to limit the force exerted by said piston.

References Cited in the file of this patent

UNITED STATES PATENTS

| | | |
|---|---|---|
| 2,284,298 | Newton | May 26, 1942 |
| 2,424,233 | Greenough | July 22, 1947 |
| 2,735,502 | Muller | Feb. 21, 1956 |
| 2,830,461 | Sheppard | Apr. 15, 1958 |